DEVICES FOR ASCERTAINING THE WEIGHT OR PRESSURE OF A PHONOGRAPH PICK-UP STYLUS UPON THE GROOVE OF A PHONOGRAPH RECORD

Filed Aug. 3, 1961

INVENTORS
William Fordeck
BY Walter J. Rysick
Frank J. Schraeder Jr.
ATTORNEY 3,078,935

DEVICES FOR ASCERTAINING THE WEIGHT OR PRESSURE OF A PHONOGRAPH PICK-UP STYLUS UPON THE GROOVE OF A PHONOGRAPH RECORD

William Fordeck, R.R. 1, Garrett, Ind., and Walter J. Rysick, 7207 Rose Ann Parkway, Fort Wayne, Ind.

Filed Aug. 3, 1961, Ser. No. 129,111
4 Claims. (Cl. 177—126)

One of the objects of our invention is found in the provision of a device which is particularly adapted for ascertaining the weight or pressure of a phonograph pick-up stylus upon the groove of a phonograph record so that if necessary an adjustment may be made by means of the counterweight or compensating spring usually provided on the pick-up arm for this purpose.

Another object of our invention resides in the provision of a device which is portable and readily foldable into such compact form that its pair of pivotally associated interengageable arms provide adequate protection for its delicate parts during its transport in folded position; such compact form consisting in the novel construction and arrangement of the pivotally associated inter-foldable pair of arms, the longer one of said arms functioning as a convenient handle for the device and the other or shorter arm having thereon visible gram calibrations cooperating with a flexible weight or pressure responsive cantilevered beam adapted together with said calibrations for indicating the pressure being exerted by the stylus upon the groove of the phonograph record.

Another object of our invention is found in the improved details of construction of the various parts of the device thereby tending to enhance the stability and smooth operation of the device and insure its accuracy of operation.

Still another object of our invention resides in the provision of an elongated flexible cantilevered beam secured at one end thereof to a support securely mounted within the channel portion of the handle for the device; an end of the free arcuate portion of the beam being arranged to traverse the gram scale calibrations on the shorter arm to indicate the weight or pressure of an object carried on the free end of a hanger pivotally connected to the free end of the beam.

It is also an important feature of our invention to provide the support for the cantilevered beam in adjustable form including, what may conveniently be termed, a slotted keeper plate adapted for affording shortening or lengthening the effective free end portion of the beam to thus selectively vary the linear adjustment at the 15 gram deflection graduation of the gram scale.

The various features of novelty whereby the present invention is characterized will hereinafter be pointed out with particularity in the claims, but, for a full understanding of the invention and of its objects and advantages, reference may be had to the following detailed description taken in connection with the accompanying drawing, wherein:

Figures 1, 2, 3, 4, 5:
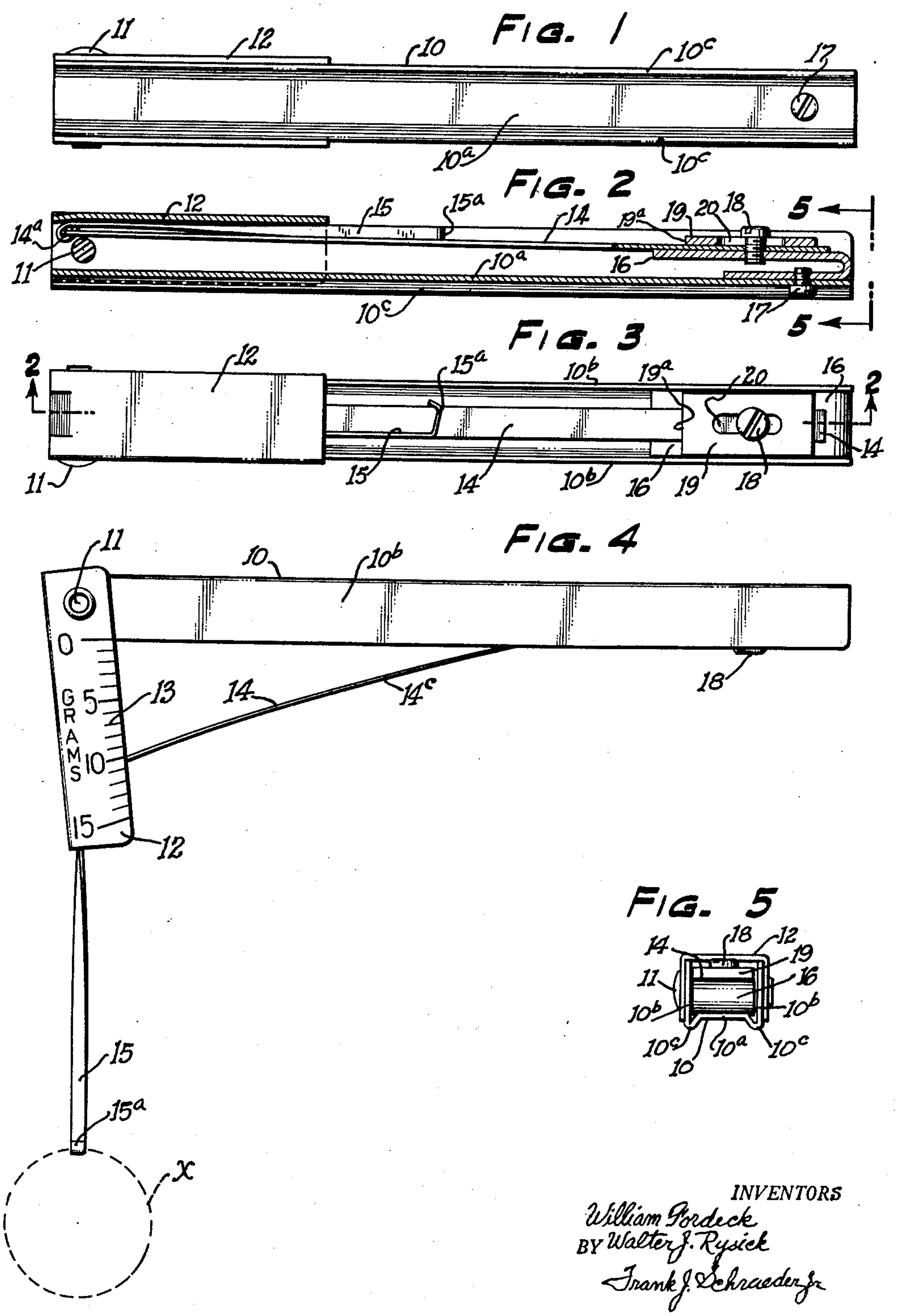
FIGURE 1 is a top view of the device in folded position.
FIGURE 2 is a longitudinal section taken on line 2—2 of FIG. 3.
FIGURE 3 is a bottom view of the device in folded position.
FIGURE 4 is a side elevation of the device in operative position.
FIGURE 5 is an end view looking in the direction of arrows 5—5.

Our invention, as shown in its preferred embodiment in the drawing, comprises a metallic arm of channel or U-shaped cross-section designated by numeral 10 and a comparatively shorter metallic arm 12, also of U-shaped cross-section, pivotally frictionally connected to the arm 10 as at 11; the longer arm 10 functioning as a handle for the device while the operatively associated shorter arm 12, which carries gram calibrations 13 on its side face, is adapted to be moved into an operative position at substantially a right angle to the arm 10 during the use of the device.

The arm 10 is formed with a base portion 10[a] and right-angularly extending side wall portions 10[b] integrally joined with the base portion 10[a] with rib-like formations 10[c] to provide enhanced structural strength to the device, as shown more clearly in FIG. 5.

An important element of our device consists of a flexible cantilevered beam 14 of very thin, narrow, elongated resilient material such as for example, spring steel, the free end of which has pivotally secured thereto, as at 14[a], a suitable hanger 15 formed at its free end with an integral hook 15[a] or other suitable means for supporting thereon the weight of a phonograph tone arm or other object during the use of the device.

The flexible resilient beam 14 is provided with means for adjustably securing it within the channeled portion of the device consisting of a support 16 of U-shaped cross-section secured to the base 10[a] as by screw 17 which is threaded into one leg of the support 16 while the other leg of the support 16 carries an end of the beam 14 that is perforated to receive a securing screw 18 which is threaded into said other leg of said support.

The secured end of the beam 14 is provided with an adjustable slotted keeper plate 19 which is adjustably secured to the support 16 by the screw 18 that extends through an elongated slot 20 into the support 16. It is important to note that the slot 20 permits the keeper plate 19 to be adjustably shifted longitudinally of the handle arm 10 into a selectively adjusted position which thus permits shortening or lengthening the free end portion of the flexible resilient beam 14 that extends beyond the effective end 19[a] of the keeper plate 19 to thus permit variation of full scale deflection adjustment of the gram scale which is one of the important features of our invention and obviously plays an important role in the initial calibration of the unit which is attainable by simply loosening screw 18 to thus permit adjustment of the keeper plate 19 longitudinally of the device.

Our improved device is shown in its operative unfolded position in FIG. 4 with the free end of the cantilevered beam 14 extending into the channeled portion of the gram-calibrated arm 12; the beam 14 being shown deflected under the load of an object or phonograph tone arm which, for convenience of illustration, is diagrammatically shown in broken lines designated X suspended from the lower end of the hanger 15. The beam 14 functions as a cantilever to deflect in an amount governed by the suspended weight; the thin flat spring 14 may be readily sighted by the operator opposite the calibrations 13 to clearly indicate the weight or pressure in grams exerted by the suspended object X or by the stylus upon the groove of a phonograph record.

When in use, the arcuate portion 14[c] of the beam 14 which extends from the inner edge 19[a] of the keeper plate 19 to the terminal end 14[a] of the beam 14, is considered as the effective free end portion of the beam and, when the device is in use, it is the free end of this portion that traverses the gram scale 13 and indicates the pressure exerted by the stylus upon the phonograph record groove.

It will be understood by those skilled in the art to which our invention relates that the details of construction of the various parts and their relative arrangements, shown in the drawing for illustrative purposes, may be modified and rearranged within the scope of the appended claims without departing from the spirit of the invention.

We claim:

1. A device for ascertaining the weight or pressure of a phonograph pick-up stylus upon the groove of a phonograph record comprising a first elongated metallic member of channel-shaped cross-section constituting a handle member for the device, a second comparatively shorter member of channel-shaped cross-section pivotally, frictionally, secured to said handle member constituting a gram scale having gram designating calibrations on one side thereof, an elongated comparatively thin flat flexible cantilevered beam of spring steel, a support for said beam mounted within the channel portion of said handle member, means for securing said support to said handle member, a keeper plate adjustable longitudinally of said handle member adapted to retain one end of said beam for cantilevered action, means for securing said keeper plate in longitudinally adjusted position relatively to said support, a hanger pivotally connected to the free end of said flexible beam disposed in vertical position while supporting the weight of an object at its free end, the free end portion of said flexible beam assuming slightly arcuate form as it traverses the gram scale calibrations on said shorter member to indicate the weight or pressure of an object carried on the free end of said hanger.

2. A device as set forth in claim 1 wherein said keeper plate has an elongated longitudinally extending slot therein and wherein said beam has a threaded hole in the secured end thereof in registration with said slot, and a screw extending through said slot and through said hole into threaded connection with said support.

3. A device as set forth in claim 1 wherein said second member is adapted to be positioned at an angle relatively to said handle member and frictionally retained in such position, and wherein said beam support consists of a U-shaped element having one leg thereof secured to said handle member, said beam being secured at one end thereof to the other leg of said U-shaped element.

4. In a device as set forth in claim 1 wherein the extent of the extension of the arcuate portion of said beam beyond said keeper plate is adjustable longitudinally relatively to said support by the slidable adjustment of the keeper plate relatively to said support.

References Cited in the file of this patent

UNITED STATES PATENTS

| | | |
|---|---|---|
| 2,523,492 | Berry | Sept. 26, 1950 |
| 2,816,750 | Martin | Dec. 17, 1957 |